No. 703,392. Patented July 1, 1902.
A. DOERING.
PLATFORM SCALE.
(Application filed Oct. 7, 1901.)
(No Model.)

Witnesses
Jno. Robb
Wm Jacob

Inventor
August Doering.
By
R.S.&A.B. Lacey.
Attorneys

THE NORRIS PETERS CO., PHOTO-LITHO., WASHINGTON, D. C.

UNITED STATES PATENT OFFICE.

AUGUST DOERING, OF BURT, IOWA, ASSIGNOR OF THREE-FOURTHS TO WM. K. FERGUSON, E. J. MURTAUGH, AND WILFRID P. JONES, OF ALGONA, IOWA.

PLATFORM-SCALE.

SPECIFICATION forming part of Letters Patent No. 703,392, dated July 1, 1902.

Application filed October 7, 1901. Serial No. 77,885. (No model.)

*To all whom it may concern:*

Be it known that I, AUGUST DOERING, a citizen of the United States, residing at Burt, in the county of Kossuth and State of Iowa, have invented certain new and useful Improvements in Platform-Scales; and I do hereby declare the following to be a full, clear, and exact description of the invention, such as will enable others skilled in the art to which it appertains to make and use the same.

This invention aims to protect the bearings of scale-levers of the type used for ascertaining the weight of goods in bulk and transported in carriers, such as wagons, cars, and the like. As a result of thus protecting the bearings the accuracy of the scales is preserved for a longer time, the period of usefulness prolonged, and the responsiveness of the machine to changes in weight insured.

Other objects than those enumerated will be apparent to those skilled in the art as the invention is comprehended, and to the ascertainment of the means devised for effecting the ends in view reference is to be had to the following description and the drawings hereto attached, in which—

Figure 1:
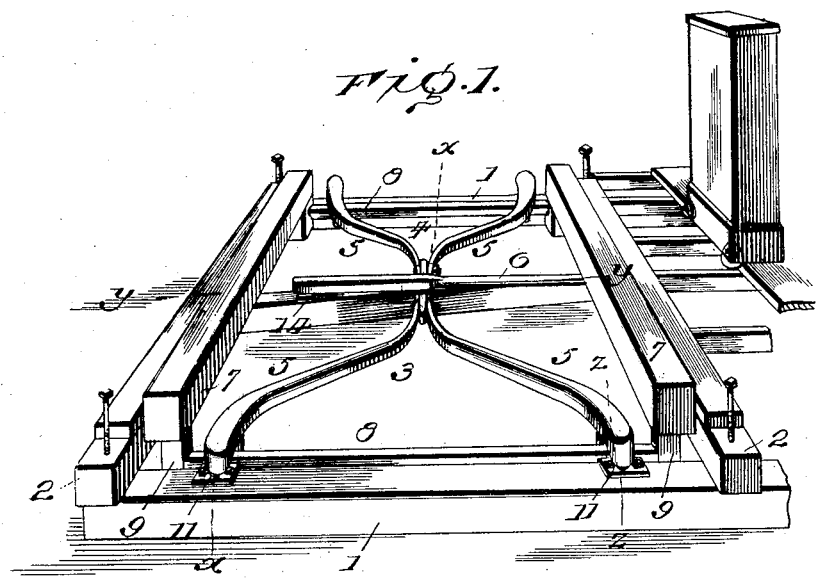
Figure 2:
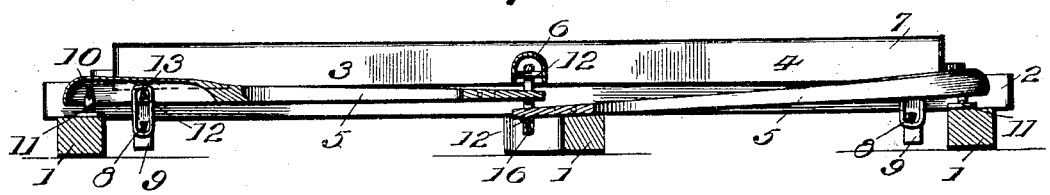
Figure 3:
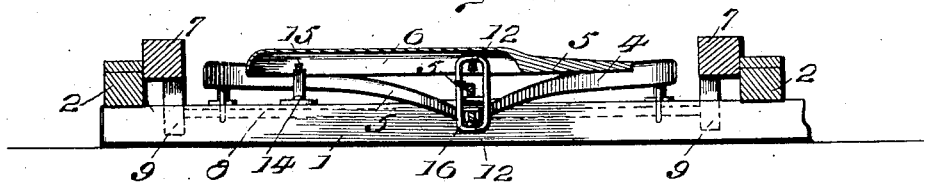
Figure 4:
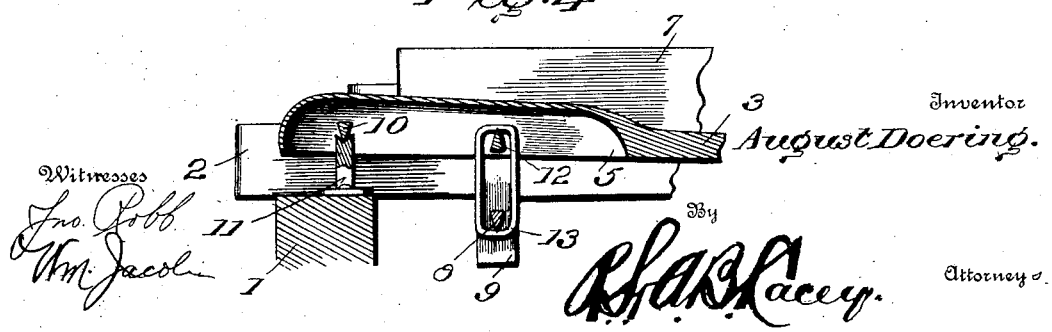

Figure 1 is a perspective view of a pair of scales embodying the invention, the platform being omitted to show more clearly the relation of the several levers. Fig. 2 is a longitudinal section about on the line X X of Fig. 1. Fig. 3 is a section about on the line Y Y of Fig. 1. Fig. 4 is a section on the line Z Z of Fig. 1 on a larger scale.

Corresponding and like parts are referred to in the following description and indicated in all the views of the drawings by the same reference characters.

The invention is shown in connection with platform-scales for weighing wagons, cars, and like carriers or merchandise, and the framework at the mouth of the pit or well may be of usual construction and comprises end beams 1 and longitudinal beams 2, said beams being connected in any substantial manner at their points of crossing. The platform-levers 3 and 4 are of the usual type, each being composed of a pair of arms 5, outwardly diverged, and a single arm $5^a$ for connection with the third or weight-transmitting lever 6. The arms 5 and $5^a$ may be separately formed and joined in any substantial way or may be integral, as desired. The frame for carrying the platform comprises longitudinal sills 7 and transverse connecting-bars 8, attached thereto in any way—as, for instance, by being supported at their ends in brackets 9, pendent from the ends of the sills 7. The outer ends of the arms 5 are widened and made hollow upon their lower sides to receive and house the pivot-bearings, whereby they are protected from wet, dirt, and foreign matter, which are a source of great annoyance and expense in the maintenance of scales of this character. Each arm is provided with a knife-edged bearing 10, arranged for coöperation with a corresponding bearing-stud 11, attached to the respective end beams 1 or equivalent support. These bearing-studs 11 are secured to the end beams 1 in any desired way, and, as shown, are provided with baseplates apertured to receive the fastenings for attachment of the said plates to the beams 1. The upper ends of the bearing-studs 11 are notched to receive the edges of the bearings 10, the meeting portions being located within the space of the chambered end of the arms, so as to be fully protected. Other knife-edged bearings 12 are located in the space of each of the arms and receive the upper ends of links 13, in which are suspended the transverse bars 8, having knife-edged bearings at their lower side to obtain a purchase upon the lower ends of the said links. The links and their respective bearings are protected by the overhanging portion of the respective arms 5, as clearly indicated in the drawings.

The lever 6 for transmitting the weight to the scale-beam has its inner end portion recessed or made hollow upon its lower side for the sole purpose of protecting the bearings between it and the platform-levers and the fulcrum-support. The fulcrum of the lever 6 consists of a bearing-stud 14, similar in construction to the bearing-stud 11, and a knife-edged bearing 15, the latter being secured to the lever and extending across the space formed in the lower side. A shackle 16 is suspended from a knife-edged bearing $12^a$ of the lever 6, and the other arm $5^a$ of the lever 4 bears upon the lower end of the shackle, whereas the arm $5^a$ of the lever 3 bears upon the cross-bar e, joining the side bars of the shackle at a point between their ends. By having the lever 6 overhanging the shackle 16 the pivot-bearings between it and the levers 3, 4, and 6 are protected in a great measure from ice, snow, dirt, and other matter falling from above and which would otherwise tend to clog the bearings and interfere with the responsive action of the scales to slight differences in weight.

From the foregoing it will be understood that the pivot-bearings of the several levers are housed in such a manner as to be free from foreign matter falling from above, the same being shed by the levers by reason of their peculiar formation and the arrangement of the pivot-bearings with reference to the chambered portions thereof.

Having thus described the invention, what is claimed as new is—

In platform-scales, platform-levers having their inner ends overlapped and each comprising outwardly-diverged arms having their outer end portions widened and chambered upon their lower sides, two knife-edged bearings arranged within the chamber of each of the said arms, bearing-studs coöperating with a set of the said knife-edged bearings, a platform-support comprising transverse bars having knife-edged bearings at their lower sides, links connecting said bars with the other set of knife-edged bearings of the platform-levers, a third lever arranged transversely of the platform-levers and having its inner end portion chambered on its lower side, bearings for the said lever protected by the chamber thereof, and a shackle connecting the third lever with the platform-levers, the pivot-bearings between the shackle and the several levers being protected by the chambered portion of said third lever, substantially as set forth.

In testimony whereof I affix my signature in presence of two witnesses.

AUGUST DOERING. [L. S.]

Witnesses:
I. WERNERT,
SAMUEL KINSCELLER.